UNITED STATES PATENT OFFICE.

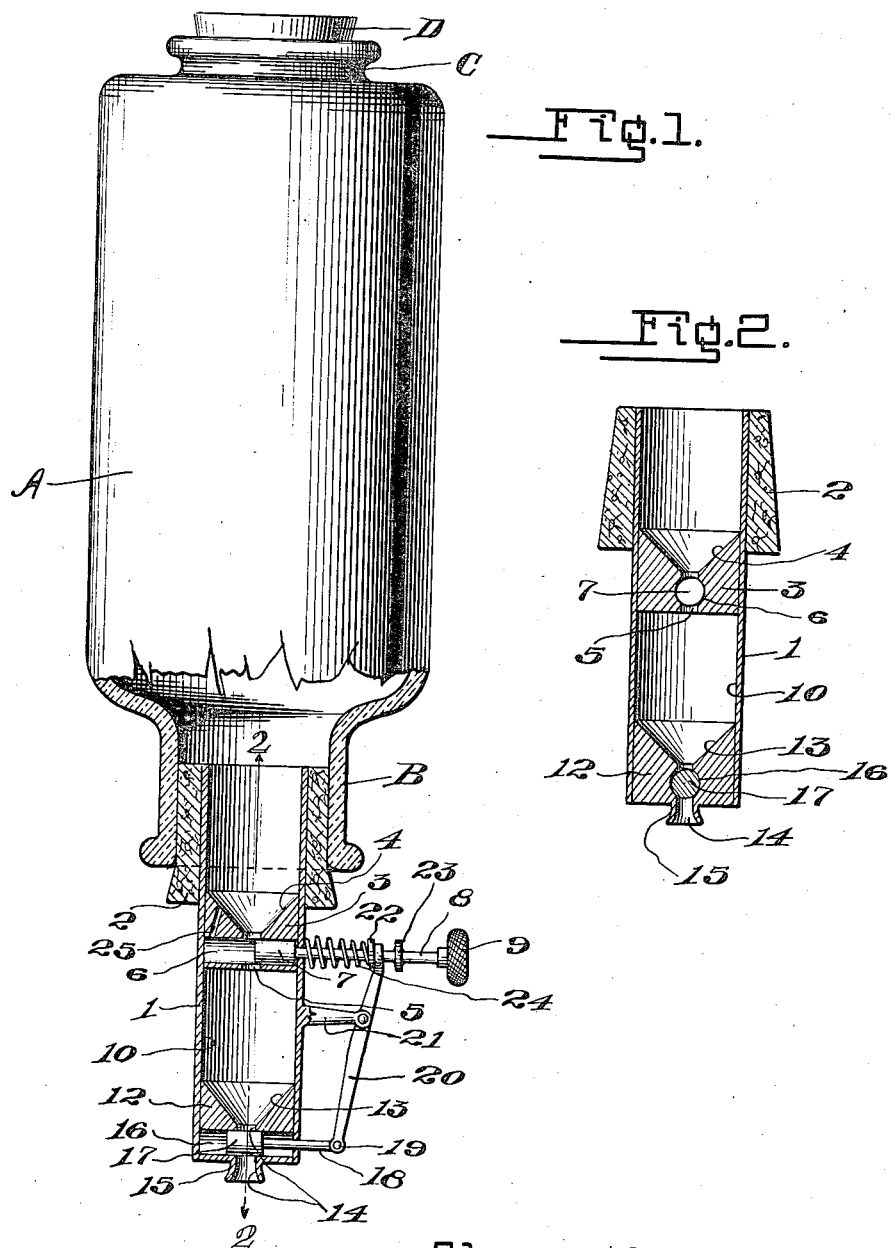

CLARENCE J. WALKER, OF CONNEAUT LAKE, PENNSYLVANIA.

MEDICINE-MEASURING DEVICE.

1,375,430. Specification of Letters Patent. Patented Apr. 19, 1921.

Application filed March 13, 1919. Serial No. 282,303.

*To all whom it may concern:*

Be it known that I, CLARENCE J. WALKER, a citizen of the United States, residing at Conneaut Lake, in the county of Crawford and State of Pennsylvania, have invented certain new and useful Improvements in Medicine-Measuring Devices, of which the following is a specification.

This invention relates to measuring and dispensing devices and more particularly to such a device particularly designed for use in measuring and dispensing a predetermined quantity of medicine or analogous liquid from a bottle or other container.

In hospitals, considerable difficulty is experienced in properly measuring medicine, particularly where teaspoons are employed as measuring mediums and it is an object of this invention to provide a device adapted for connection with a model or analogous container which will measure and dispense a predetermined quantity of liquid into any suitable receptacle such as a small glass, the said measuring and dispensing operation being performed by the simple pushing movement upon a button, thereby materially decreasing the amount of labor and time necessary to measure the medicine and also insuring the exact measurement of the exact quantity desired.

More specifically, the invention comprehends the provision of a sleeve or tube which may have a cork about one end of the same adapted to fit in the neck of a bottle and which carries a pair of superposed valve members, the lower of which is normally closed while the upper is open to permit liquid to flow into the space between the said valve members, which space is of such size as to measure a predetermined quantity of medicine, and to associate a push button and lever with said valve mechanism whereby the upper valve will be closed immediately prior to the opening of the lower valve, preventing the passage of liquid into the measuring space during the dispensing of liquid therefrom.

Other objects of the invention will appear from the following detailed description, taken in connection with the accompanying drawings, forming a part of this specification and in which drawing:

Figure 1 is a longitudinal section through the improved dispensing and measuring device showing the same connected to a bottle.

Fig. 2 is a longitudinal section on the line 2—2 of Fig. 1.

Referring more particularly to the drawings, A indicates a medicine or liquid container, which is shown in the drawings as a bottle provided with openings in both ends, namely provided with a neck B as ordinary in the construction of bottles and having a relatively short neck C in its bottom end which is closed by a cork D or any suitable closure. While this particular type of container is shown, it is to be understood that the improved measuring and dispensing structure may be employed in connection with any suitable type of container without departing from the spirit of this invention.

The measuring and dispensing device includes a tube 1 which may be made of any suitable material, and one end of which is adapted to fit into a cork 2. The cork 2 is inserted in the neck B of the bottle or container A, as shown in Fig. 1.

The tube 1 has an obstruction 3 positioned therein intermediate its ends which obstruction is provided with a substantially conical recess 4 opening into a vertical opening 5 positioned axially within the obstruction 3. This obstruction 3 is also provided with a transversely or radially extending opening 6 in which is slidably mounted a piston 7. The piston 7 is carried by one end of a stem 8, slidably supported from the dispensing device. The stem 8 has a button or head 9 upon its outer end for displacing the stem and moving the piston 7 into registration with the spaced portion of the vertical opening 5 to cut off the flow of liquid through the obstruction 3 into the measuring space 10 within the tube, which measuring space is formed between the upper obstruction 3 and the lower or outer obstruction 12. This latter obstruction 12 is provided with a substantially conical recess 13 which opens out into a vertical axially disposed opening 14. This opening 14 extends through a flared nipple 15 formed upon the lower end of the obstruction and it is bisected by a transverse bore or opening 16 which receives therein a piston 17. The piston 17 is carried by a pin 18, the outer end of which is pivotally connected as shown at 19 to a lever 20. The lever 20 is pivotally mounted intermediate its ends upon a suitable support 21 and its upper end is slidably mounted upon the stem 8, being movable between spaced collars 22 and 23, formed upon the stem.

In use, the stem 8 is normally held in its outward position by a spiral spring 24, which holds the piston 7 out of registration with the spaced portions of the opening 5 and allows the liquid to flow from the container or bottle A into the space 10 where it is confined by the piston 17 which closes the bore or opening 14, when the opening 5 is opened. When it is desired to dispense the quantity of liquid contained within the measuring portion 10, the button 9 is depressed or forced inwardly and during this inward movement the stem 8 and the piston 7 move independently of movement of the lever, the distance between the collars 22 and 23 allowing the piston 7 to close the opening 5 before the piston 17 is moved out of registration with the opening 14, thereby permitting the dispensing of only the quantity of liquid contained in the measuring compartment 10. When the pressure is relieved from the button 9, the spring 24 will force the stem 8 outwardly moving the piston 7 out of registration with the opening 5 and moving the piston 17 into closing position in the opening 14. The obstruction 3 is provided with a relatively small opening 25 extending upwardly from the transverse opening 6 and into the conical recess 4 therein to permit any liquid which may be contained in the bore 6 in front of the inner end of the piston 7 to be forced upwardly therethrough so as to allow the free movement of the piston in the bore.

Changes in details may be made without departing from the spirit of this invention, but;

I claim:

1. In combination with a bottle having a neck communicating with the interior of the bottle and extending downwardly when the bottle is in inverted position, a second neck extending upwardly from the bottom of the inverted bottle, a removable stopper for the last-mentioned neck, a stopper for the first-mentioned neck having a bore therethrough, a tube having its upper end entering the bore in said last-mentioned stopper and communicating with the interior of the bottle, an obstruction within the tube and located intermediately of the ends thereof, said obstruction having a hopper-shaped upper portion with an opening at its apex, said obstruction provided with a transverse passage immediately beneath said opening, the bottom of said transverse passage having a second opening in alinement with the first-mentioned opening, a piston fitted to reciprocate in said transverse passage and adapted to cover both of said openings, a stem connected to said piston and projecting through the side of said tube, a button on the outer end of said stem, a lever having its upper end freely fitted about the stem, a bracket extending from the tube and carrying said lever, a coil spring extending about the stem and acting on the stem and said lever whereby to hold the piston and lever in an initial position, a collar on the stem spaced from the end of the lever when the parts are in the initial position but adapted to engage the lever end when the stem is moved, a second obstruction in the base of the tube provided with a hopper-shaped upper portion with an opening in its apex and a transverse passage beneath the opening and having a discharge port in its bottom vertically beneath the opening, a piston traveling in said last-mentioned passage, and a stem connected to the piston and to the lower end of said lever, said pistons adapted to alternately open and close their respective openings.

2. In combination with a bottle adapted to be inverted and having a neck, a hollow cork fitted in the neck of said bottle, a tube passing through the hollow cork, a pair of abutments spaced apart and located within said tube providing a measuring chamber therebetween, said abutments having transverse passages therethrough and openings in alinement above and below said transverse passages, pistons traveling in said transverse passages and adapted to open and close the openings alternately, stems connected to the pistons and projecting through one side of the tube, a lever fulcrumed between said abutments and having its ends connected to said valve stems, the upper end of the lever being loose on the upper valve stem, means for pushing said upper valve stem inwardly, a collar on the upper valve stem spaced from the end of said lever whereby to allow the upper piston to close its opening before the lower piston is opened, and spring means for acting on the upper valve stem and said lever whereby to normally close the lower piston and open the upper piston.

CLARENCE J. WALKER.